United States Patent
Liang et al.

(10) Patent No.: US 9,243,183 B2
(45) Date of Patent: Jan. 26, 2016

(54) METHODS OF TREATING A SUBTERRANEAN FORMATION WITH THERMALLY ACTIVATED SUSPENDING AGENTS

(71) Applicants: Feng Liang, Houston, TX (US); Gary Funkhouser, Houston, TX (US); Christopher Parton, Houston, TX (US); Philip D. Nguyen, Houston, TX (US)

(72) Inventors: Feng Liang, Houston, TX (US); Gary Funkhouser, Houston, TX (US); Christopher Parton, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 13/687,152

(22) Filed: Nov. 28, 2012

(65) Prior Publication Data

US 2014/0144630 A1    May 29, 2014

(51) Int. Cl.
| | |
|---|---|
| C09K 8/514 | (2006.01) |
| E21B 43/267 | (2006.01) |
| C09K 8/80 | (2006.01) |
| C09K 8/88 | (2006.01) |
| C09K 8/90 | (2006.01) |

(52) U.S. Cl.
CPC . *C09K 8/80* (2013.01); *C09K 8/887* (2013.01); *C09K 8/90* (2013.01); *E21B 43/267* (2013.01)

(58) Field of Classification Search
CPC .......... C09K 8/685; C09K 8/514; C09K 8/03; C09K 8/487; C09K 8/588; E21B 43/267
USPC ....................................... 166/280.2
See application file for complete search history.

(56) References Cited

U.S. PATENT DOCUMENTS

| | | | |
|---|---|---|---|
| 4,506,062 A | 3/1985 | Flesher et al. | |
| 4,528,321 A | 7/1985 | Allen et al. | |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 7,306,040 B1 | 12/2007 | Robb et al. | |
| 2007/0277981 A1* | 12/2007 | Robb et al. | 166/300 |
| 2008/0121395 A1* | 5/2008 | Reddy et al. | 166/280.2 |
| 2010/0292109 A1* | 11/2010 | Moradi-Araghi et al. | 507/224 |
| 2012/0279707 A1* | 11/2012 | Funkhouser et al. | 166/293 |

* cited by examiner

*Primary Examiner* — Catherine Loikith
*Assistant Examiner* — Ashish Varma
(74) *Attorney, Agent, or Firm* — McDermott Will & Emery LLP; Craig W. Roddy

(57) ABSTRACT

Disclosed are methods of treating a subterranean formation having at least one fracture. The methods include providing a thermal thinning resistant treatment fluid comprising an aqueous base fluid, proppant particulates, and a thermally activated suspending agent, wherein the thermally activated suspending agent is hydratable above a threshold temperature. The thermal thinning resistant treatment fluid is introduced into the subterranean formation and exceeds the threshold temperature so as to hydrate the thermally activated suspending agent. Furthermore, the proppant particulates are placed into the at least one fracture.

13 Claims, 4 Drawing Sheets

METHODS OF TREATING A SUBTERRANEAN FORMATION WITH THERMALLY ACTIVATED SUSPENDING AGENTS

BACKGROUND

The present invention relates to methods of treating a subterranean formation with thermally activated suspending agents.

Subterranean wells (e.g., hydrocarbon producing wells, water producing wells, injection wells, and the like) are often stimulated by hydraulic fracturing treatments. In hydraulic stimulation operations, a treatment fluid is pumped into a portion of a subterranean formation at a rate and pressure such that the subterranean formation breaks down and one or more fractures are formed. Typically, particulate solids, such as graded sand, are suspended in a portion of the treatment fluid and then deposited into the fractures. These particulate solids, or "proppants," serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow.

The degree of success of a stimulation operation depends, at least in part, upon fracture porosity and conductivity once the fracturing operation is stopped and production is begun. Proppant particulates are placed into the fracture in order to form a "proppant pack" that is sufficiently strong to withstand fracture closure pressures and porosity of the proppant pack is related to the interconnected interstitial spaces between abutting proppant particulates. Thus, fracture conductivity is closely related to the strength of the proppant pack, because if the proppant pack is unable to withstand fracture closure, conductivity is hindered. Traditional treatment fluids, therefore, are typically viscosified in order to more uniformly suspend proppant particulates therein to more uniformly place them into a fracture. A sufficiently high viscosity is typically needed to retain the proppant particulates in suspension and reduce their propensity to settle out of the treatment fluid prior to reaching the fracture.

Fracturing fluids are often viscosified by gelling agents, such as polysaccharides (e.g., guar gums, xanthan gums, diutan gums, cellulose derivatives, etc.), biopolymers, synthetic polymers, and/or derivatives thereof to form crosslinked gels. Despite the widespread use of viscosified treatment fluids in stimulation operations, highly viscous fluids create friction pressures that increase the energy necessary to pump the fluid downhole and may result in damage to stimulation equipment or the formation itself.

Traditional viscosified treatment fluids are additionally often thermally thinning fluids such that upon reaching a certain temperature, the fluid reverts to a less viscous fluid. The decrease in viscosity may compromise the ability of the treatment fluid to uniformly suspend and place within a fracture proppant particulates, thereby usurping the purpose and functionality of the viscosified treatment fluid. Often, the temperatures that trigger thermal thinning of viscosified treatment fluids are those found in subterranean formations. Therefore, after exerting the energy necessary to pump the viscosified treatment fluids and potentially damaging stimulation equipment and/or the fracture, the viscosity of the treatment fluid may be reduced due to downhole temperatures such that the proppant particulates settle out of the fluid and are unable to create highly conductive propped fractures. Therefore, a method uniformly delivering proppant particulates to create highly conductive propped fractures in a subterranean formation may be of benefit to one of ordinary skill in the art.

SUMMARY OF THE INVENTION

The present invention relates to methods of treating a subterranean formation with thermally activated suspending agents.

In one embodiment, the present invention provides a method of treating a subterranean formation having at least one fracture comprising: providing a thermal thinning resistant treatment fluid comprising an aqueous base fluid, proppant particulates, and a thermally activated suspending agent; wherein the thermally activated suspending agent is hydratable above a threshold temperature; introducing the thermal thinning resistant treatment fluid into the subterranean formation; exceeding the threshold temperature so as to hydrate the thermally activated suspending agent; and placing the proppant particulates into the at least one fracture.

In other embodiments, the present invention provides a method of treating a wellbore in a subterranean formation having at least one fracture comprising: providing a thermal thinning resistant treatment fluid comprising an aqueous base fluid, a proppant particulate, and a thermally activated suspending agent; wherein the thermally activated suspending agent comprises a monomer and a thermally degradable crosslinker and wherein the thermally activated suspending agent is hydratable above a threshold temperature; introducing the thermal thinning resistant treatment fluid into the subterranean formation; exceeding the threshold temperature so as to hydrate the thermally activated suspending agent; and placing the proppant particulate into the at least one fracture.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
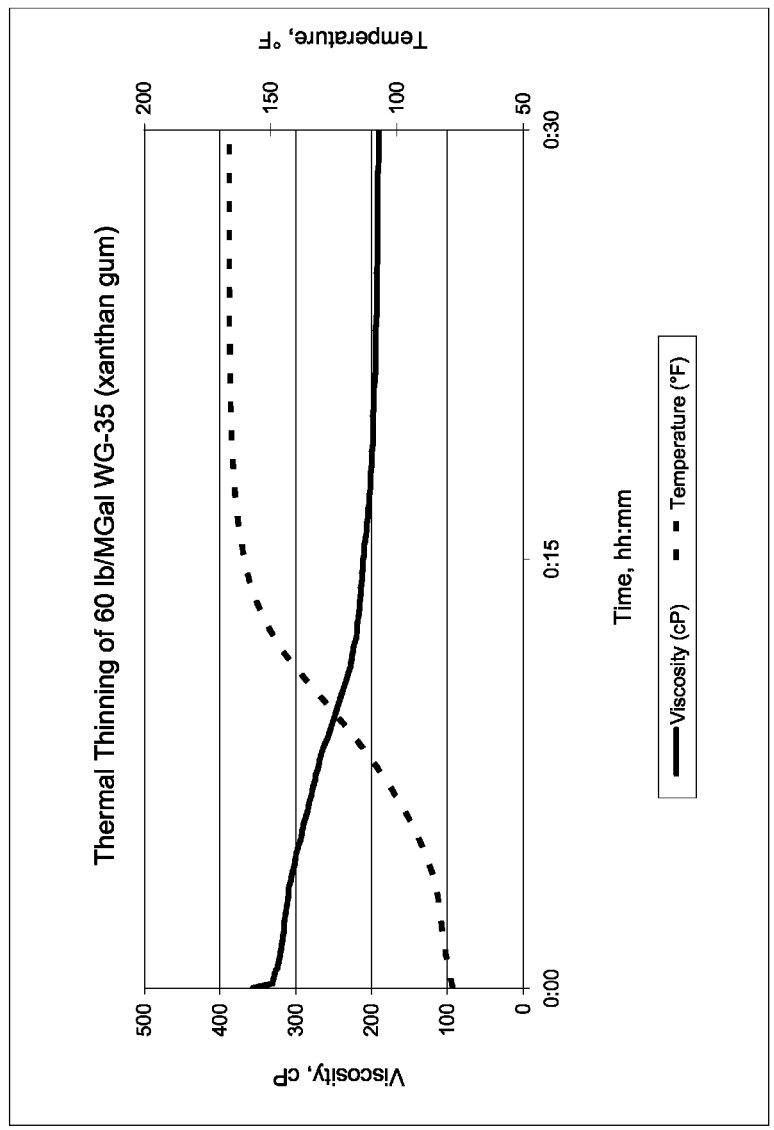
FIG. 1 depicts the thermal thinning effect of a gelled fluid containing 60 lbs/Mgal xanthan gum at 170° F.

The present invention relates to methods of treating a subterranean formation with thermally activated suspending agents.

The present invention provides for methods of uniformly introducing proppant particulates into a fracture in a subterranean formation to produce a highly conductive propped fracture. The methods taught in this disclosure use treatment fluids comprising thermally activated suspending agents to combat the tendency of some treatment fluids to thermally thin when exposed to down hole temperatures and to produce and exhibit sufficient in situ viscosity to uniformly suspend proppant particulates. The methods of the present invention employ thermally activated suspending agents that are not activated until they reach a certain temperature within a subterranean formation. Therefore, as the treatment fluids containing the thermally activated suspending agents are pumped into the wellbore, the treatment fluid does not need to be highly viscous, because its viscosity is later increased to suspend proppant particulates, thereby reducing frictional wear and tear, the likelihood of damage to stimulation equipment or the formation itself, and/or the horsepower needed to pump the fluid into the formation.

In some embodiments, the present invention provides a method comprising placing a thermal thinning resistant treatment fluid comprising an aqueous base fluid, a proppant particulate, and a thermally activated suspending agent into a subterranean formation having at least one fracture so as to produce a propped fracture. The thermally activated agent is hydratable above a certain threshold temperature present in the subterranean formation such that once the threshold temperature is exceeded within the subterranean formation, the thermally activated agent hydrates and causes the viscosity of the fluid to increase. Increasing the viscosity in this way helps to uniformly place the proppant particulate into the at least one fracture in the subterranean formation. As used herein, the term "hydrate," "hydration," or "hydratable" refers to the reaction of the thermally activated agent upon exposure to temperatures above the thermally activated suspending agent's threshold temperature such that the thermal thinning resistant treatment fluid's viscosity is increased.

Any suitable aqueous base fluid may be used in the thermal thinning resistant treatment fluid of the present invention. Suitable aqueous base fluids may comprise fresh water, saltwater (e.g., water containing one or more salts dissolved therein), brine (e.g., saturated salt water), seawater, or combinations thereof. Generally, the water may be from any source, if it does not contain components that might adversely affect the stability and/or performance of the thermal thinning resistant treatment fluids of the present invention. In certain embodiments, the density of the aqueous base fluid can be adjusted, among other purposes, to provide additional transport and suspension to the proppant particulates therein above what the thermally activated suspending agent may provide alone. In certain embodiments, the pH of the aqueous base fluid may be adjusted (e.g., by a buffer or other pH adjusting agent), among other purposes, to activate an additive within the thermal thinning resistant treatment fluids of the present invention. In some embodiments, the pH range may preferably be from about 4 to about 11.

The aqueous base fluid of the present invention may additionally be viscosified using a gelling agent, the gelling agent may further be crosslinked. The aqueous base fluid may be viscosified in order to better suspend the proppant particulates prior to activating the thermally activated suspending agent. However, because the thermally activated suspending agent increases the viscosity of the aqueous base fluid upon activation downhole, in some embodiments only a fraction of a gelling agent and/or crosslinking agent may be needed when compared to traditional fracturing fluids. Suitable gelling agents for use in the present invention may comprise any substance (e.g. a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; and any combination thereof. The gelling agents also may be cationic gelling agents; anionic gelling agents; and any combination thereof. Suitable gelling agents include, but are not limited to, polysaccharides; biopolymers; and/or derivatives thereof that contain one or more monosaccharide units including, but not limited to, galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and any combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile); 2,2'-azobis(2,4-dimethyl-4-methoxy valeronitrile); acrylamide ethyltrimethyl ammonium chloride; acrylamide; acrylamido- and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any copolymers thereof; any derivatives thereof; and any combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents. The gelling agent may be present in the treatment fluids useful in the methods of the present invention in an amount sufficient to provide the desired viscosity.

In some embodiments, it may be desirable to crosslink the gelling agents of the present invention. Crosslinking the gelling agent may result in a more viscous aqueous base fluid. Suitable crosslinking agents may include, but are not limited to, borate ions; magnesium ions; zirconium IV ions; titanium IV ions; aluminum ions; antimony ions; chromium ions; iron ions; copper ions; magnesium ions; zinc ions; and any combinations thereof. These ions may be provided by providing any compound that is capable of producing one or more of these ions. Examples of such compounds include, but are not limited to, ferric chloride; boric acid; disodium octaborate tetrahydrate; sodium diborate; pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules. When included, suitable crosslinking agents may be present in the treatment fluids useful in the methods of the present invention in an amount sufficient to provide the desired degree of crosslinking between molecules of the gelling agent. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

The thermal thinning resistant treatment fluids of the present invention may additionally comprise any additive suitable for use in a subterranean formation provided that it does not interfere with the methods of the present invention. Suitable additives may include, but are not limited to, a salt; a weighting agent; an inert solid; a fluid loss control agent; an emulsifier; a dispersion aid; a corrosion inhibitor; an emulsion thinner; an emulsion thickener; a viscosifying agent; a breaker; a foaming agent; a gas; a surfactant; a lost circulation material; a pH control additive; a biocide; a stabilizer; a chelating agent; a scale inhibitor; a gas hydrate inhibitor; a mutual solvent; an oxidizer; a reducer; a friction reducer; a clay stabilizing agent; and any combination thereof. Any additive alone or in combination may be included in the thermal thinning resistant treatment fluids of the present invention provided that they do not interfere with the functionality of the thermally activated suspending agent disclosed herein.

The proppant particulates that may be used in the thermal thinning resistant treatment fluids of the present invention may be any material suitable for use in a stimulation operation. Proppant particulates suitable for use in the methods of the present invention may be of any size and shape combination known in the art as suitable for use in a subterranean operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is that there is no need for the proppant particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length.

Suitable material compositions for the proppant particulates of the present invention include, but are not limited to, sand; bauxite; ceramic materials; glass materials; polymer materials (such as ethylene vinyl acetate or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood, composite particulates; and combinations thereof. Suitable composite particulates may comprise a binder and a filler material wherein suitable filler materials include silica; alumina; fumed carbon; carbon black; graphite; mica; titanium dioxide; barite; meta-silicate; calcium silicate; kaolin; talc; zirconia; boron; fly ash; hollow glass microspheres; solid glass; and combinations thereof. Suitable proppant particles for use in conjunction with the present invention may be any known shape of material, including substantially spherical materials; fibrous materials; polygonal materials (such as cubic materials); and combinations thereof. Proppant particulates may be present in the thermal thinning resistant treatment fluids of the present invention in an amount from about 0.1 lbs/Gal to about 10 lbs/Gal by volume of the thermal thinning resistant treatment fluid. In preferred embodiments, the proppant particulates may be present in the thermal thinning resistant treatment fluids of the present invention in an amount from about 2 lbs/Gal to about 6 lbs/Gal by volume of the thermal thinning resistant treatment fluid.

In some embodiments, a consolidating agent may be included to aid in binding individual proppant particulates together to form a proppant pack. Suitable consolidating agents may include any consolidating agents suitable for use in stimulation operations. Nonlimiting examples of suitable consolidating agents include, but are not limited to, non-aqueous tackifying agents; aqueous tackifying agents; emulsified tackifying agents; silyl-modified polyamide compounds; resins; crosslinkable aqueous polymer compositions; polymerizable organic monomer compositions; consolidating agent emulsions; zeta-potential modifying aggregating compositions; silicon-based resins; binders; any derivatives thereof; and any combinations thereof. The consolidating agent may be present in the thermal thinning resistant treatment fluids of the present invention in an amount from about 0.1% to about 10% by weight of the proppant particulate. In preferred embodiments, the consolidating agent may be present in the treatment fluids of the present invention from about 1% to about 5% by weight of the proppant particulate. It is within the ability of one skilled in the art, with the benefit of this disclosure, to determine the need and type and amount of consolidating agent to include in the methods of the present invention to achieve the desired results.

In some embodiments of the present invention, degradable particulates may be included in the thermal thinning resistant treatment fluids such that they intermix with proppant particulates and form a portion of the proppant pack. Upon a triggering event, the degradable particulates may be degraded, leaving behind spaces in the proppant pack that may enhance the conductivity of the propped fracture. It may be desirable that the degradable particulate has similar particle size, shape, and specific gravity as those of the proppant particulates. Suitable degradable particulates may include, but are not limited to, oil-degradable polymers; degradable polymers; degradable salts; blends thereof; and any combinations thereof. In some embodiments of the present invention, degradable particulates are included in the thermal thinning resistant treatment fluids of the present invention from about 1% to about 20% by weight of the proppant particulates. In preferred embodiments, degradable particulates are included in the thermal thinning resistant treatment fluids of the present invention from about 15% to about 5% by weight of the proppant particulates. One of ordinary skill in the art with the benefit of this disclosure will recognize whether to include and the optimum concentration of degradable material to include in the thinning resistant fluids of the present invention to achieve the desired results.

In some embodiments, the thermally activated suspending agent is hydratable above a threshold temperature. As used herein, the term "threshold temperature" refers to the temperature that causes a reversible transition of the thermally activated suspending agent from one state to another state (e.g., from a brittle or hardened state into a rubber-like state) so as to increase the viscosity of the thermal thinning resistant treatment fluid within which it is included. The threshold temperature for any particular thermally activated suspending agent is dependent upon the composition of the particular thermally activated suspending agent. An advantage of using this method, the specific temperature of a subterranean formation at a particular desired depth can be used as the activating threshold temperature of a particularly selected or group of particularly selected thermally activated suspending agents. That is, the method taught herein is customizable to the exact parameters of the stimulation operation being performed. Generally, the thermally activated suspending agents of the present invention are designed to activate at threshold temperatures from about 120° F. to about 300° F. These threshold temperatures in a subterranean formation may be represented by the bottom hole static temperature of the formation.

In preferred embodiments, the thermally activated suspending agent is selected so as to hydrate at or before the temperature at which the traditional gelling agent tends to lose viscosity. In that way, the viscosity of the treatment fluid can remain stable throughout the treatment and placement of proppant. In other embodiments, it may be desirable to have the viscosity of the fluid increase as the proppant is sent downhole. Such embodiments may use additional thermally activated suspending agent that is able to increase the fluid viscosity even as the traditional gelling agent loses its ability to suspend. In still other embodiments, a reduced volume of the thermally activated suspending agent may be used, so that the viscosity of the fluid is allowed to fall, just not as sharply as it would have without the thermally activated suspending agent.

The thermally activated suspending agent of the present invention may be of any shape or form suitable for use in a particular stimulation operation. Suitable forms include, but are not limited to, emulsion form; chopped gel form; solid particulate form; liquid dispersion polymer form; or any combination thereof. In some embodiments, the thermally activated suspending agent is present in the thermal thinning resistant treatment fluids of the present invention an amount from about 0.1% to about 20% by weight of the thermal thinning resistant treatment fluid. In preferred embodiments, the thermally activated suspending agent is present in the thermal thinning resistant treatment fluids of the present invention in an amount from about 2% to about 10% by weight of the thermal thinning resistant treatment fluid.

In some embodiments, the thermally activated suspending agent is a thermally-hydratable polymer. Suitable thermally-hydratable polymers may be any polymers capable of use in a subterranean formation having a threshold temperature upon which when exposed, it is capable of increasing the viscosity of the thermal thinning resistant treatment fluids of the present invention. Examples of suitable thermally-hydratable polymers for use in the present invention include, but are not limited to, a polysaccharide; a cellulose ether; a starch; a polyvinyl alcohol; any copolymers thereof; any derivatives thereof; and any combinations thereof.

In some embodiments, the thermally activated suspending agent is formed by a monomer and a thermally degradable crosslinker. In some embodiments, the monomer and thermally degradable crosslinker are present in an amount from about 20:1 to about 1000:1 by weight of each other. In preferred embodiments, the monofunction monomer and the thermally degradable crosslinker are present in an amount from about 100:1 to about 500:1 by weight of each other. Suitable monomers for use in the thermally activated suspending agents of the present invention may include, but are not limited to, an ethylenically unsaturated monomer of the general formula: $CH_2=CXY$, wherein X and Y may be hydrogen, methyl, an alkoxy amide group, or an acetamide group; an ionizable monomer; N,N-dimethylacrylamide; sodium 2-acrylamido-2-methylpropanesulfonate; 2-acrylamido-2-methylpropanesulfonic acid; 1-N,N-diethylaminoethyl methacrylate; diallyldimethylammonium chloride; acrylic acid; sodium acrylate; an allylic monomer; diallyl phthalate; diallyl maleate; allyl diglycol carbonate; vinyl formate; vinyl acetate; vinyl propionate; vinyl butyrate; itaconic acid; N-(hydroxymethyl)acrylamide; N-(hydroxyethyl)acrylamide; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a vinyl amide; N-vinylformamide; 1-vinyl-2-pyrrolidinone; N-vinylcaprolactam; N-acryloyl morpholine; N-methyl-N-vinylacetamide; N-isopropylacrylamide; N,N-diethylacrylamide; sodium 4-styrenesulfonate; and vinylsulfonic acid; and any combinations thereof.

In some embodiments, thermally degradable crosslinkers may include, but are not limited to, ethoxylated glycerol triacrylate; pentaerythritol tetraacrylate; ethoxylated pentaerythritol tetraacrylate; pentaerythritol triacrylate; trimethylolpropane triacrylate; ethoxylated trimethylolpropane triacrylate; and any combination thereof. In other embodiments, the thermally degradable crosslinker comprises at least one degradable group and at least two unsaturated terminal groups. The at least one degradable group comprising the thermally degradable crosslinker may include, but is not limited to, an ester; a phosphate ester; an amide; an acetal; a ketal; an orthoester; a carbonate; an anhydride; a silyl ether; an alkene oxide; an ether; an imine; an ether ester; an ester amide; an ester urethane; a carbonate urethane; any derivates thereof; and any combinations thereof. The at least two unsaturated terminal groups comprising the thermally activated degradable crosslinker may include, but is not limited to, an alkene group; an alkyne group; an acrylate group; a vinyl group; an ortho styryl group; a meta styryl group; a para styryl group; an acryloyl group; a methacryloyl group; an acryloxy group; a methacryloxy group; a 1-propenyl group; a 1-butenyl group; a 1-pentenyl group; a 3-methyl-1-butenyl group; a phenylethenyl group; an ethynyl group; a 1-propynyl group; a 1-butynyl group; a 1-pentynyl group; a 3-methyl-1-butynyl group; a phenylbutynyl group; any derivatives thereof; and any combinations thereof.

To facilitate a better understanding of the present invention, the following examples of preferred or representative embodiments are given. In no way should the following examples be read to limit, or to define, the scope of the invention.

Figure 3:
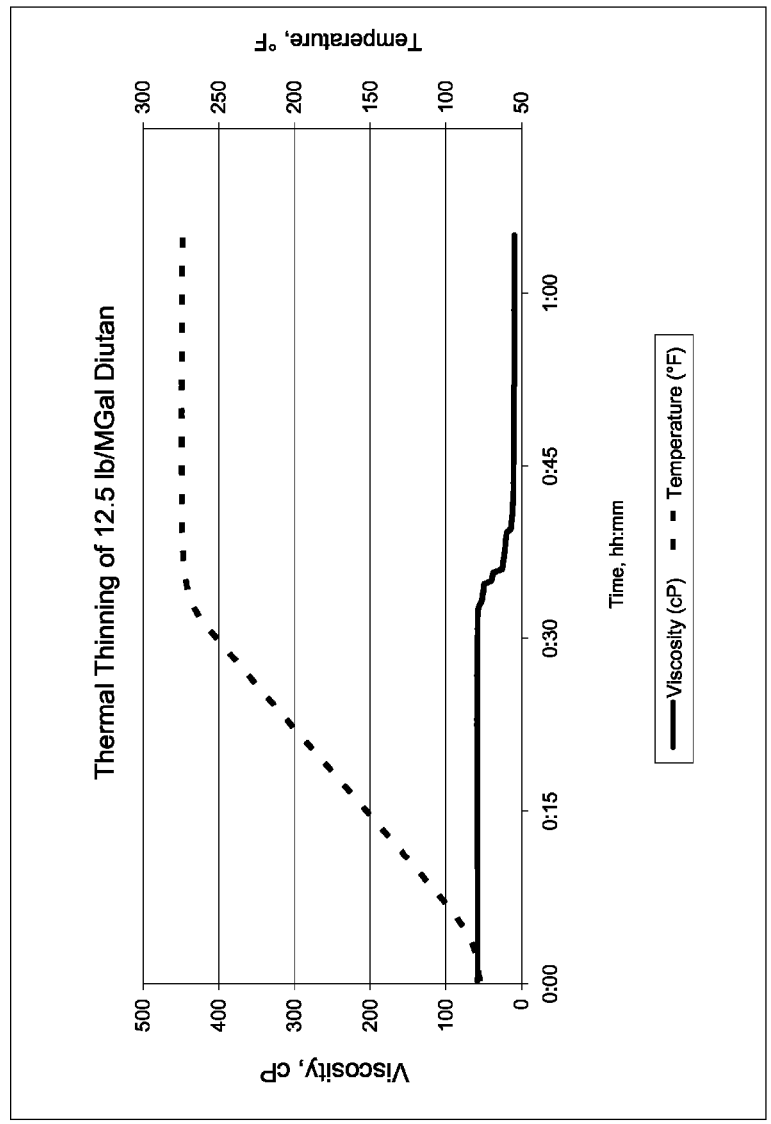
FIG. 3 depicts the thermal thinning effect of a gelled fluid containing 12.5 lbs/Mgal diutan gum at 275° F.

FIG. 3 depicts the thermal thinning effect of a gelled fluid containing 12.5 lbs/Mgal diutan gum at 275° F.

Figure 4:
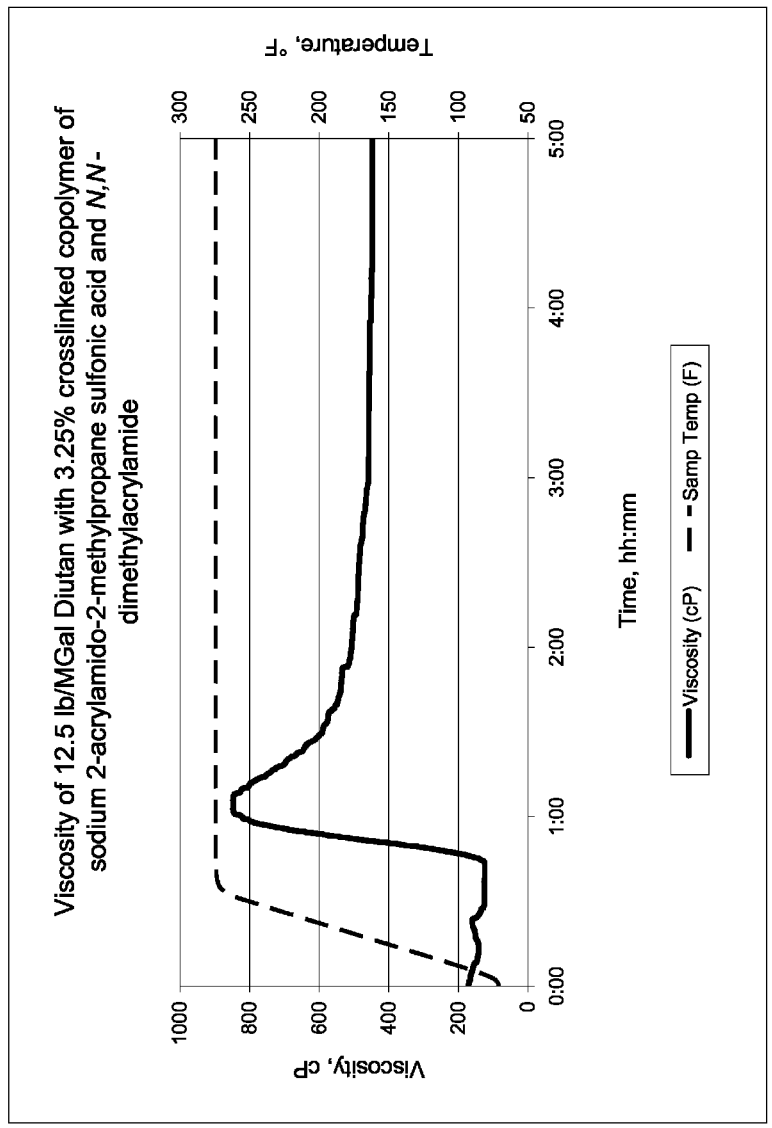
FIG. 4 shows the viscosity of a gelled fluid containing 60 lbs/Mgal diutan gum at 275° F. in the presence of a thermally activated suspending agent of the present invention comprising 3.25% crosslinked copolymer of sodium 2-acrylamido-2-methylpropane sulfonic acid and N,N-dimethylacrylamide.

FIG. 4 shows the viscosity of a gelled fluid containing 60 lbs/Mgal diutan gum at 275° F. in the presence of a thermally activated suspending agent of the present invention comprising 3.25% crosslinked copolymer of sodium 2-acrylamido-2-methylpropane sulfonic acid and N,N-dimethylacrylamide.

EXAMPLES

Example 1

In this example, the thermal thinning of a gelled fluid containing 60 lbs/Mgal WG-37™ Gelling Agent, commercially available xanthan gum from Halliburton, Houston, Tex. was evaluated. The gelled fluid was prepared by adding 0.72 grams (g) of WG-35™ to 100 milliliters (mL) of deionized water. The mixture was briefly blended at low speed and allowed to hydrate for 30 minutes. The viscosity of the gelled fluid was measured using a Chandler viscometer with a 5× Bob at a shear rate of 40 sec$^{-1}$ by measuring the gelled fluid at a temperature beginning at 75° F. and reaching 170° F. The viscosity of the gelled fluid was 330 centipoise (cP) at 75° F. and 190 cP at 170° F. The results are shown in FIG. 1.

Example 2

Figure 2:
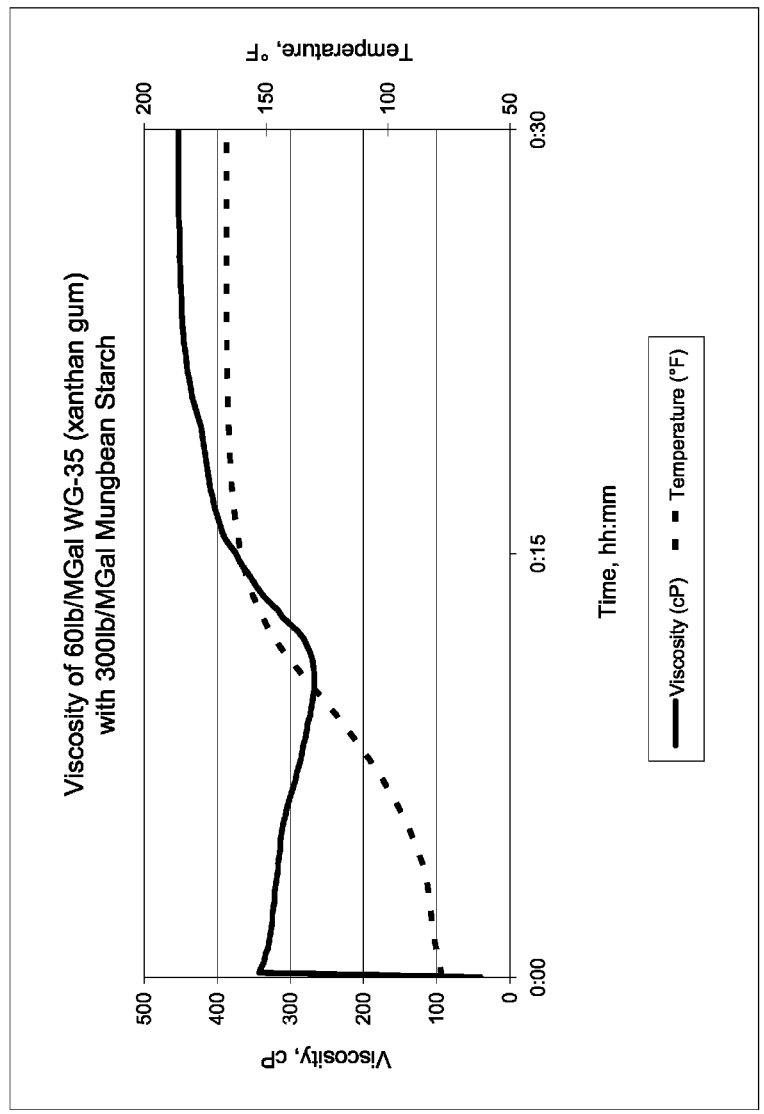
FIG. 2 shows that the viscosity of a gelled fluid containing 60 lbs/Mgal xanthan gum at 170° F. in the presence of a thermally activated suspending agent of the present invention comprising 300 lbs/Mgal mungbean starch.

A gelled fluid containing 60 lbs/Mgal WG-37™ Gelling Agent was prepared according to Example 1. To the gelled fluid, 300 lbs/Mgal mungbean starch was added to act as a thermally activated suspending agent. Mungbean starch is hydratable at 130° F. The viscosity of the gelled fluid containing the thermally activated suspending agent was measured using a Chandler viscometer with a 5× Bob at a shear rate of 40 sec$^{-1}$ by measuring the gelled fluid at a temperature beginning at 75° F. and reaching 170° F. The viscosity was 340 cP at 75° F. and reduced to 130 cP at 130° F. due to the thermal thinning of the fluid. Upon reaching the hydration temperature of the mungbean starch, the viscosity of the gelled fluid increased and reached 450 cP at 170° F. FIG. 2 depicts the results.

Example 3

In this example, the thermal thinning of a gelled fluid comprising 12.5 lbs/Mgal diutan gum at 275° F. was evaluated. The gelled fluid was prepared by adding 0.225 g of diutan gum in 150 mL of deionized water. The mixture was blended briefly at low speed and allowed to hydrate for 30 min; 0.75 g of sodium carbonate was then added to the mixture. The viscosity of the gelled fluid was measured using a Chandler viscometer with a 5× Bob at a shear rate of 40 sec$^{-1}$ by measuring the gelled fluid at a temperature beginning at 75° F. and reaching 275° F. The viscosity of the gelled fluid was 58 cP at 75° F. and 10 cP at 275° F. The results are shown in FIG. 3.

Example 4

A gelled fluid containing 12.5 lbs/Mgal diutan gum was prepared according to Example 1. To the gelled fluid, 4.875 g of a crosslinked copolymer of sodium 2-acrylamido-2-methylpropane sulfonic acid and N,N-dimethylacrylamide was added to act as a thermally activated suspending agent. The crosslinked copolymer of sodium 2-acrylamido-2-methylpropane sulfonic acid and N,N-dimethylacrylamide was prepared using 71% N,N-dimethylacrylamide, 24% sodium 2-acrylamido-2-methylpropanesulfonate, 4.8% triethylene glycol diacrylate, and 57 ppm N,N'-methylenebisacrylamide. The crosslinked copolymer of sodium 2-acrylamido-2-methylpropane sulfonic acid and N,N-dimethylacrylamide experiences crosslink breaks at 275° F. The viscosity of the gelled fluid containing the thermally activated suspending agent was measured using a Chandler viscometer with a 5× Bob at a shear rate of 40 sec$^{-1}$ by measuring the gelled fluid at a temperature beginning at 75° F. and reaching 275° F. The viscosity was 170 cP at 75° F. and reduced to 120 cP just under 275° F. due to the thermal thinning of the fluid. Upon reaching 275° F., the crosslinks of the crosslinked copolymer of sodium 2-acrylamido-2-methylpropane sulfonic acid and N,N-dimethylacrylamide began to break and the viscosity of the gelled fluid increased and stabilized at 450 cP at 275° F. FIG. 4 depicts the results.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation having at least one fracture comprising:
    providing a thermal thinning resistant treatment fluid comprising an aqueous base fluid, proppant particulates, degradable particulates, a gelling agent, and a thermally activated suspending agent,
        wherein the degradable particulates are present in an amount from about 1% to about 20% by weight of the proppant particulates,
        wherein the thermally activated suspending agent comprises a monomer and a first thermally degradable crosslinker selected from the group consisting of ethoxylated glycerol triacrylate; pentaerythritol tetraacrylate; ethoxylated pentaerythritol tetraacrylate; pentaerythritol triacrylate; trimethylolpropane triacrylate; ethoxylated trimethylolpropane triacrylate; and any combination thereof,
        wherein the gelling agent viscosifies the thermal thinning resistant treatment fluid,
        wherein the thermally activated suspending agent is hydratable and activated above a threshold temperature in the range of from about 120° F. to about 300° F., and
        wherein the thermally activated suspending agent is hydratable and activated at or before the viscosity of the thermal thinning resistant treatment fluid due to the gelling agent is lost;
    introducing the thermal thinning resistant treatment fluid into the subterranean formation;
    exceeding the threshold temperature so as to hydrate the thermally activated suspending agent; and
    placing the proppant particulates and the degradable particulates into the at least one fracture to form an intermixed proppant pack with both the proppant particulates and the degradable particulates therein.

2. The method of claim 1, wherein the thermally activated suspending agent is present in an amount from about 0.1% to about 20% by weight of the thermal thinning resistant treatment fluid.

3. The method of claim 1, wherein the monomer is selected from the group consisting of an ethylenically unsaturated monomer of the general formula: $CH_2=CXY$, wherein X and Y may be hydrogen, methyl, an alkoxy amide group, or an acetamide group; an ionizable monomer; N,N-dimethylacrylamide; sodium 2-acrylamido-2-methylpropanesulfonate; 2-acrylamido-2-methylpropanesulfonic acid; 1-N,N-diethylaminoethyl methacrylate; diallyldimethylammonium chloride; acrylic acid; sodium acrylate; an allylic monomer; diallyl phthalate; diallyl maleate; allyl diglycol carbonate; vinyl formate; vinyl acetate; vinyl propionate; vinyl butyrate; itaconic acid; N-(hydroxymethyl)acrylamide; N-(hydroxyethyl)acrylamide; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a vinyl amide; N-vinylformamide; 1-vinyl-2-pyrrolidinone; N-vinylcaprolactam; N-acryloyl morpholine; N-methyl-N-vinylacetamide; N-isopropylacrylamide; N,N-diethylacrylamide; sodium 4-styrenesulfonate; and vinylsulfonic acid; and any combinations thereof.

4. The method of claim 1, wherein the thermally activated suspending agent further comprises a second thermally degradable crosslinker comprising at least one degradable group and at least two unsaturated terminal groups.

5. The method of claim 4, wherein the at least one degradable group is selected from the group consisting of an ester; a phosphate ester; an amide; an acetal; a ketal; an orthoester; a carbonate; an anhydride; a silyl ether; an alkene oxide; an ether; an imine; an ether ester; an ester amide; an ester urethane; a carbonate urethane; any derivates thereof; and any combinations thereof.

6. The method of claim 4, wherein the at least two unsaturated terminal groups are selected from the group consisting of an alkene group; an alkyne group; an acrylate group; a vinyl group; an ortho styryl group; a meta styryl group; a para styryl group; an acryloyl group; a methacryloyl group; an acryloxy group; a methacryloxy group; a 1-propenyl group; a 1-butenyl group; a 1-pentenyl group; a 3-methyl-1-butenyl group; a phenylethenyl group; an ethynyl group; a 1-propynyl group; a 1-butynyl group; a 1-pentinyl group; a 3-methyl-1-butynyl group; a phenylbutynyl group; any derivatives thereof; and any combinations thereof.

7. The method of claim 1, wherein the thermal thinning resistant treatment fluid further comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a crosslinking agent; a breaker; a foaming agent; a gas; a surfactant; a lost circulation material; a pH control additive; a biocide; a stabilizer; a chelating agent; a scale inhibitor; a gas hydrate inhibitor; a mutual solvent; an oxidizer; a reducer; a friction reducer; a clay stabilizing agent; and any combination thereof.

8. A method of treating a wellbore in a subterranean formation having at least one fracture comprising:
    providing a thermal thinning resistant treatment fluid comprising an aqueous base fluid, a proppant particulate, degradable particulates, a gelling agent, and a thermally activated suspending agent,
        wherein the thermally activated suspending agent comprises a monomer and a first thermally degradable crosslinker selected from the group consisting of ethoxylated glycerol triacrylate; pentaerythritol tetraacrylate; ethoxylated pentaerythritol tetraacrylate; pentaerythritol triacrylate; trimethylolpropane triacrylate; ethoxylated trimethylolpropane triacrylate; and any combination thereof,
wherein the gelling agent viscosifies the thermal thinning resistant treatment fluid,
wherein the thermally activated suspending agent is hydratable and activated above a threshold temperature in the range of from about 120° F. to about 300° F., and
wherein the thermally activated suspending agent is hydratable and activated at or before the viscosity of the thermal thinning resistant treatment fluid due to the gelling agent is lost;
introducing the thermal thinning resistant treatment fluid into the subterranean formation;
exceeding the threshold temperature so as to hydrate the thermally activated suspending agent; and
placing the proppant particulates and the degradable particulates into the at least one fracture into the at least one fracture to form an intermixed proppant pack with both the proppant particulates and the degradable particulates therein.

9. The method of claim 8, wherein the thermally activated suspending agent is present in an amount from about 0.1% to about 20% by weight of the thermal thinning resistant treatment fluid.

10. The method of claim 8, wherein the monomer is selected from the group consisting of an ethylenically unsaturated monomer of the general formula: $CH_2=CXY$, wherein X and Y may be hydrogen, methyl, an alkoxy amide group, or an acetamide group; an ionizable monomer; N,N-dimethylacrylamide; sodium 2-acrylamido-2-methylpropanesulfonate; 2-acrylamido-2-methylpropanesulfonic acid; 1-N,N-diethylaminoethyl methacrylate; diallyldimethylammonium chloride; acrylic acid; sodium acrylate; an allylic monomer; diallyl phthalate; diallyl maleate; allyl diglycol carbonate; vinyl formate; vinyl acetate; vinyl propionate; vinyl butyrate; itaconic acid; N-(hydroxymethyl)acrylamide; N-(hydroxyethyl)acrylamide; acrylamide; methacrylamide; methacrylonitrile; acrolein; methyl vinyl ether; ethyl vinyl ether; vinyl ketone; ethyl vinyl ketone; allyl acetate; allyl propionate; diethyl maleate; a vinyl amide; N-vinylformamide; 1-vinyl-2-pyrrolidinone; N-vinylcaprolactam; N-acryloyl morpholine; N-methyl-N-vinylacetamide; N-isopropylacrylamide; N,N-diethylacrylamide; sodium 4-styrenesulfonate; and vinylsulfonic acid; and any combinations thereof.

11. The method of claim 8, wherein the thermally activated suspending agent further comprises a second thermally degradable crosslinker comprising at least one degradable group and at least two unsaturated terminal groups.

12. The method of claim 11, wherein the at least one degradable group is selected from the group consisting of an ester; a phosphate ester; an amide; an acetal; a ketal; an orthoester; a carbonate; an anhydride; a silyl ether; an alkene oxide; an ether; an imine; an ether ester; an ester amide; an ester urethane; a carbonate urethane; any derivates thereof; and any combinations thereof.

13. The method of claim 11, wherein the at least two unsaturated terminal groups are selected from the group consisting of an alkene group; an alkyne group; an acrylate group; a vinyl group; an ortho styryl group; a meta styryl group; a para styryl group; an acryloyl group; a methacryloyl group; an acryloxy group; a methacryloxy group; a 1-propenyl group; a 1-butenyl group; a 1-pentenyl group; a 3-methyl-1-butenyl group; a phenylethenyl group; an ethynyl group; a 1-propynyl group; a 1-butynyl group; a 1-pentinyl group; a 3-methyl-1-butynyl group; a phenylbutynyl group; any derivatives thereof; and any combinations thereof.

* * * * *

UNITED STATES PATENT AND TRADEMARK OFFICE
CERTIFICATE OF CORRECTION

| | | |
|---|---|---|
| PATENT NO. | : 9,243,183 B2 | Page 1 of 1 |
| APPLICATION NO. | : 13/687152 | |
| DATED | : January 26, 2016 | |
| INVENTOR(S) | : Feng Liang et al. | |

It is certified that error appears in the above-identified patent and that said Letters Patent is hereby corrected as shown below:

Title page

Item (71) Applicant: should read: Halliburton Energy Services, Inc.

Signed and Sealed this
Twenty-sixth Day of April, 2016

Michelle K. Lee
*Director of the United States Patent and Trademark Office*